(12) United States Patent
Reynolds

(10) Patent No.: US 6,982,054 B2
(45) Date of Patent: *Jan. 3, 2006

(54) GASKET FOR CLADDING SYSTEM

(75) Inventor: Donald Arthur Reynolds, West Yorkshire (GB)

(73) Assignee: SD Investments Limited, West Yorkshire (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 385 days.

(21) Appl. No.: 09/486,875

(22) PCT Filed: Sep. 16, 1998

(86) PCT No.: PCT/GB98/02812

§ 371 (c)(1),
(2), (4) Date: May 8, 2000

(87) PCT Pub. No.: WO99/15752

PCT Pub. Date: Apr. 1, 1999

(65) Prior Publication Data

US 2003/0006524 A1    Jan. 9, 2003

(30) Foreign Application Priority Data

Sep. 24, 1997  (GB) .................................. 9720163

(51) Int. Cl.
*B29C 45/14* (2006.01)

(52) U.S. Cl. ...................... 264/145; 264/145; 264/148; 264/259; 264/294; 52/204.57; 52/204.1; 52/287.1; 52/309.2

(58) Field of Classification Search ................ 264/138, 264/148, 152, 145, 141, 153, 294, 280; 49/473; 29/428; 405/119; 52/213, 204.57, 204.1, 52/204.58, 287
See application file for complete search history.

(56) References Cited

U.S. PATENT DOCUMENTS

| 2,249,028 | A | * | 7/1941 | Mulderink |
| 2,364,962 | A | * | 12/1944 | Eagles |
| 2,392,734 | A | * | 1/1946 | Haberstump |
| 2,637,073 | A | * | 5/1953 | Walther |
| 3,958,369 | A | * | 5/1976 | Mathellier .................. 49/479.1 |
| 4,183,778 | A | * | 1/1980 | Mesnel |
| 5,069,849 | A | * | 12/1991 | Wain |
| 5,256,361 | A | * | 10/1993 | Keys |
| 5,699,603 | A | * | 12/1997 | Backes et al. |

FOREIGN PATENT DOCUMENTS

| JP | 56017240 A | * | 2/1981 |
| JP | 63034107 A | * | 2/1988 |

* cited by examiner

Primary Examiner—Leo B. Tentoni
Assistant Examiner—Monica A. Fontaine
(74) Attorney, Agent, or Firm—Howard & Howard

(57) ABSTRACT

A method of forming a joint (32) between two plastics extrusions (10) is disclosed which comprises mitring the extrusions (10) so that they form the desired angle to one another, removing part of the rear face of each extrusion (10) placing the mitred extrusions in a mould and injecting a resin material whereby to bond the extrusions (10) to one another and produce the desired joint (32) configuration. Because the front surface (24) of the joint in accordance with the invention is entirely made up from the original extrusion, there are no problems with raised sight-lines, colour differentials, surface differences, or colour matching. Moreover, the method of the invention allows a corner to be produced which has a clean right angled rather than radiused inner portion.

4 Claims, 4 Drawing Sheets

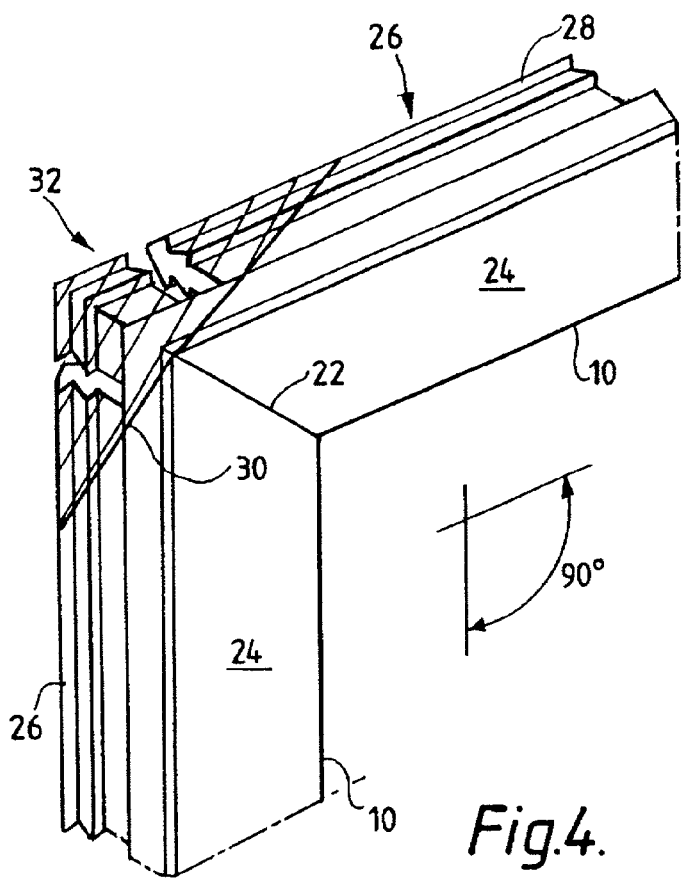
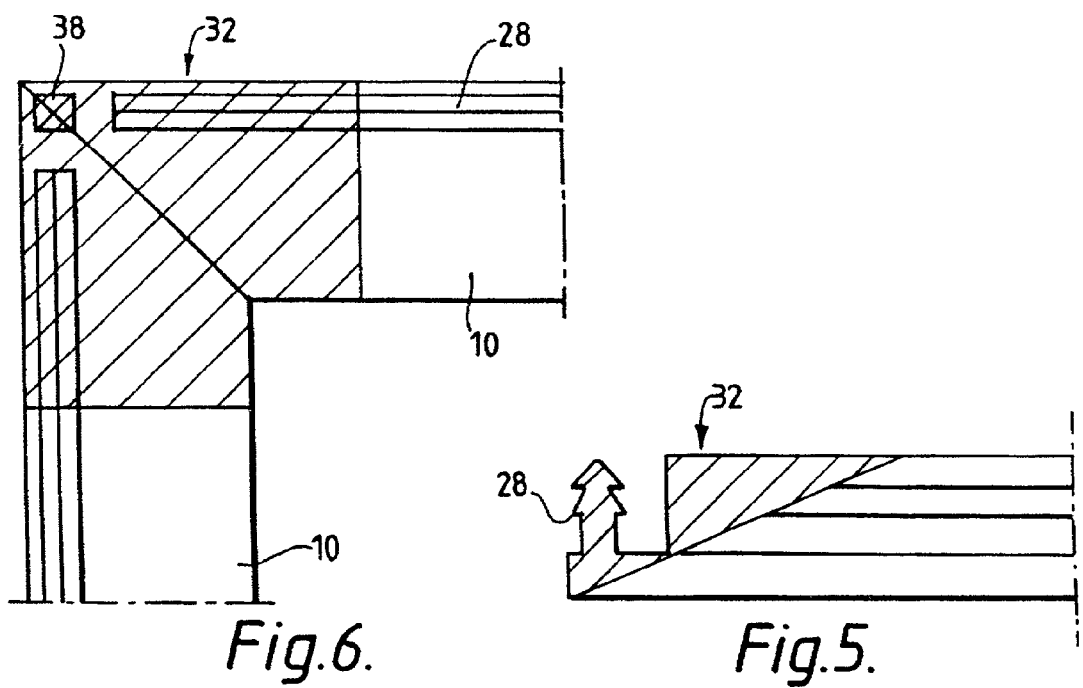
Fig.4.
Fig.6.
Fig.5.

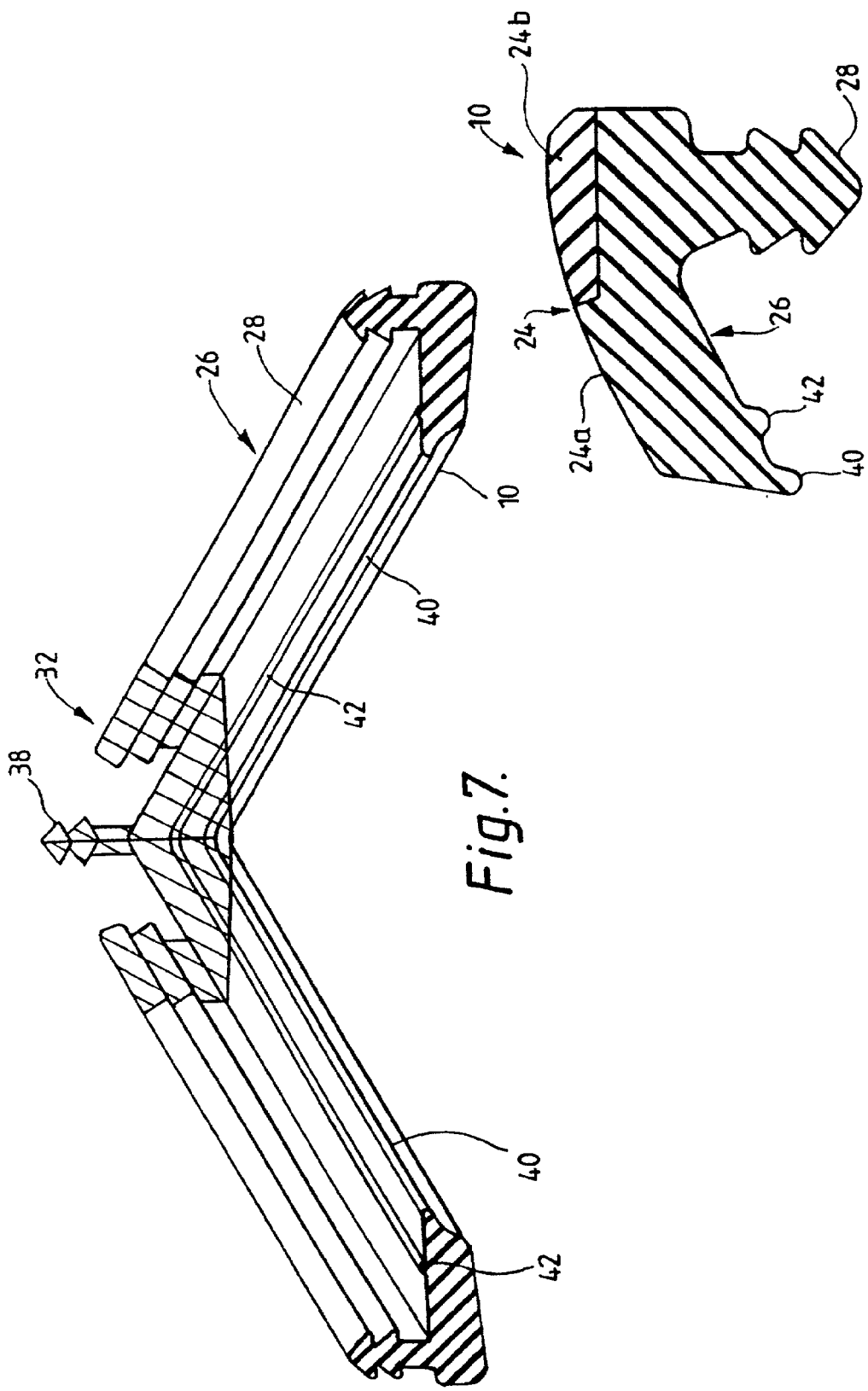

GASKET FOR CLADDING SYSTEM

BACKGROUND OF THE INVENTION

1. Technical Field

This invention relates to an improved method of producing a gasket for a building cladding, curtain wall or glazing system, and to the gasket so made.

2. Description of the Prior Art

The term 'gasket' refers to the rubber or other plastics material extrusions used to hold or seal an infill into a framework or the like in a curtain walling/glazing system in the construction of buildings.

In our published UK patent specification number 2 023 703 and our European patent publication number 0 059 058 building systems are described in which infill members are held in place on a framework by means of a flexible gasket which locates and is gripped by the framework and has a limb extending so as to bear against the infill and hold it in place. This system is very successful and is used extensively. A particular feature of it, which appeals to architects, is that the gasket can be of various colours, or indeed multi-coloured, to produce a desired aesthetic effect.

One problem area in connection with the gaskets of the above systems is in connection with the gasket corners. Reference to FIGS. 1 and 2 of the accompanying drawings illustrates the current method of producing corners. The main runs of the gasket are extruded to the desired length. Two extrusions 10 are inserted into a mould 12 and a shot of silicone compound is inserted under pressure into the heated mould forming a joint 14 between the two extrusions. Because the moulding is carried out under pressure, it is easy for protruding lines 16 to appear on the resultant product, which are not aesthetically pleasing. Similarly, because the corner is injected rather than extruded, there is very often a colour differential and a different surface finish between the corner 14 and the extrusions 10. In addition, the corner needs to be radiused at 18 to ensure weather-tightness when a clean right angle may be preferred aesthetically. Finally, it is only possible to use a single solid colour whereas the extrusions can be produced in multiple colours or with metallic pigments.

The invention seeks to provide a method of forming a gasket joint, e.g. corner, improved in the above respects.

According to the present invention there is provided a method of forming a joint between two plastics extrusions which comprises mitring the extrusions so that they form the desired angle to one another, removing part of the rear face of each extrusion, placing the mitred extrusions in a mould and injecting a resin material whereby to bond the extrusions to one another and produce the desired joint configuration.

Because the front surface of the joint in accordance with the invention is entirely made up from the original extrusion, there are no problems with raised sight-lines, colour differentials, surface differences, or colour matching. Moreover, the method of the invention allows a corner to be produced which has a clean right angled rather than radiused inner portion.

The extrusions will be made from a suitable plastics materials, e.g. as described in the above mentioned patent publications. Currently it is preferred that the extrusions are made from a silicone rubber, although other plastics materials may be used. Accordingly the resin used to form the joint is normally also a silicone rubber mix which will cure under heat and pressure in order to produce the joint, although other compatible plastics materials can be used. Also, although the invention is especially useful when used with the extrusions of our above referred to patent publications, it has wider applications and can be used to join plastics extrusions in the curtain wall/glazing field generally, wherever it is desired to maintain the surface appearance of an extrusion through the joint or corner.

The invention further includes a gaskets having joints formed in accordance with the above.

BRIEF DESCRIPTION OF THE DRAWINGS

The invention will be described further, by way of example, with reference to the accompanying drawings, in which:

FIG. 4 is a perspective view corresponding to FIG. 3;

FIG. 5 is a partial sectional view;

FIG. 6 is a rear elevation corresponding to FIG. 3;

FIG. 7 is a rear perspective view;

FIG. 8 is a cross-sectional view of the extrusion on an enlarged scale; and

DESCRIPTION OF THE PREFERRED EMBODIMENT

Figure 1:
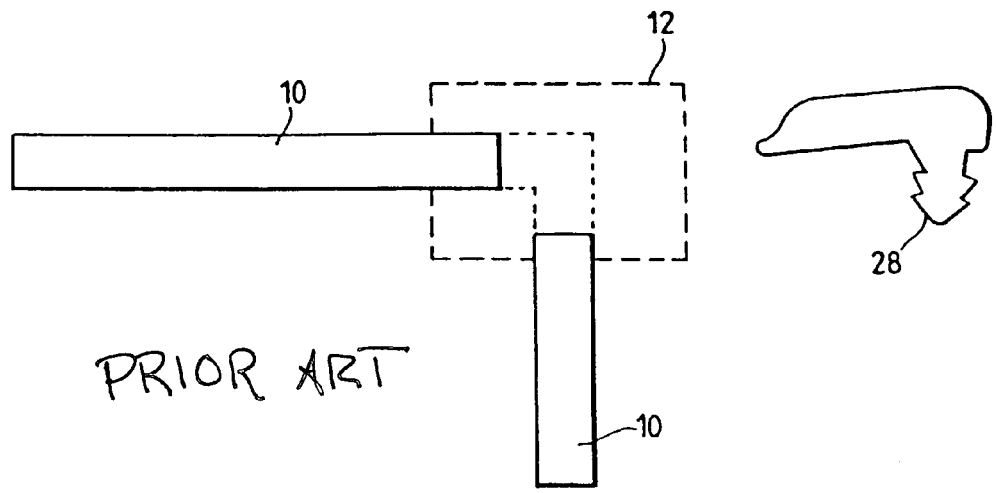
FIGS. 1 and 2 are diagrammatic illustrations of the current method.
Figure 2:
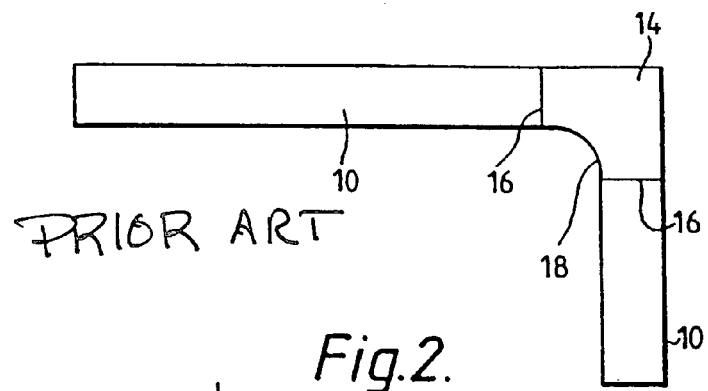
Figure 3:
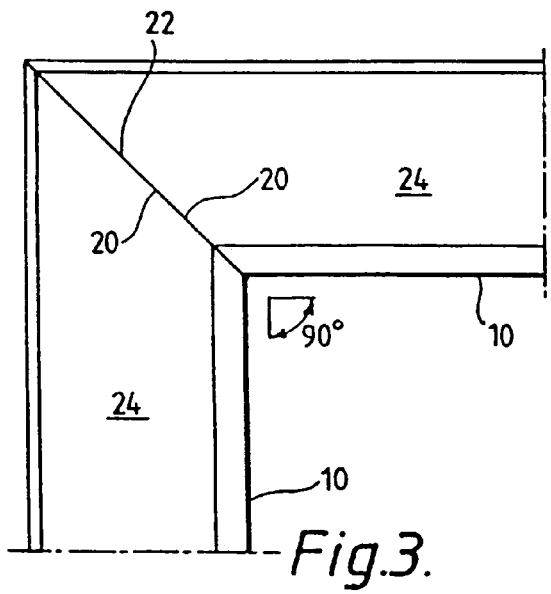
FIG. 3 is a front elevational view of a seal in accordance with the method of the invention.
Figure 9:
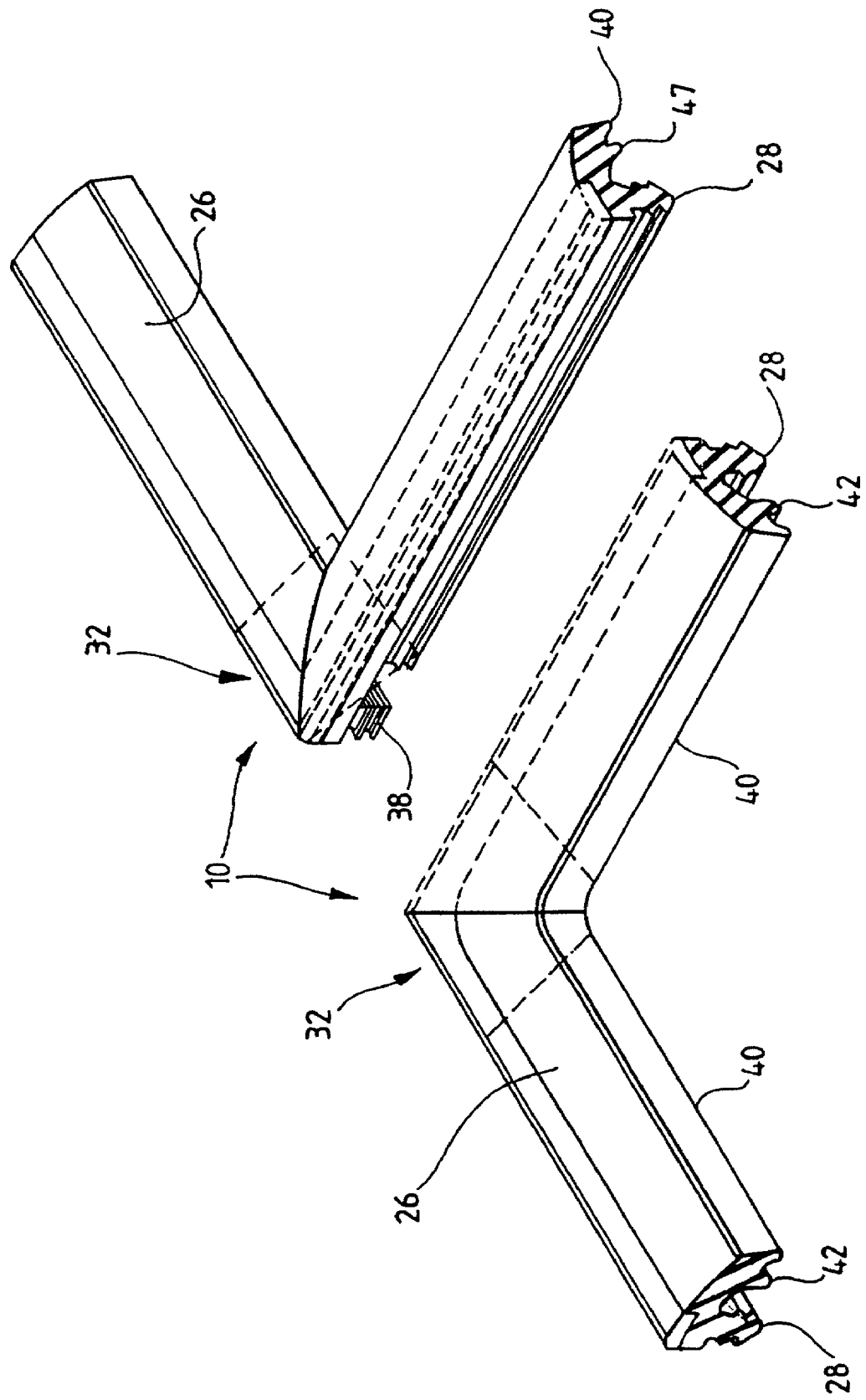
FIG. 9 shows perspective views of the extrusion from both sides.

Referring to the drawings, and firstly FIGS. 1 and 2, as has been indicated above in the existing method of forming a corner joint two extrusions 10 are brought together in a mould 12 and injected with a silicone material under heat and pressure to produce a joint 14. The inner corner of the joint 14 is radiused at 18.

Referring now to FIGS. 3 to 9, in the method of the invention, by contrast, and using like numbers for like parts, the extrusions 10 are mitred at an appropriate angle, for example 45° to produce a 90° corner (although other angles may be used for different shape infill panels). The mitred ends 20 are brought together in a butt joint 22. The extrusions 10 have front faces 24 and rear faces 26. The latter are moulded with indented "foot" portions 28 designed to locate in channels in the building framework (not shown).

In the area of the joint the back of each extrusion 10 is cut away along a line 30 at the back of the extrusions. Thus, the front faces 24 are left untouched.

The butt joined cut-away extrusions are then put into a mould of the requisite shape and injected with a suitable resin 32, e.g. a silicone, as before. The mould is shaped to continue the foot portions 28 and to provide a pillar 38 if required by the system. From the front, therefore, the extrusions are unbroken and any multi-colour lines, metallic lines, or the like continue unbroken to the butt joint 22. There are no unsightly raised lines and the problems with the previous method of joining are overcome.

The extrusions 10 have sealing lips 40 as before which bear against the infill, e.g. double glazing unit, in use. In accordance with the invention it is preferred, in addition, to provide a second sealing lip 42 on the extrusions 10 which can be continued in the area of the join 32. This ensures that the corner is weather-tight and obviates the need to radius the inner corner of the joint, i.e. the seal 40, allowing a "clean" 90° angle to be achieved. It is preferred to radius i.e., curve the inner lip 42 around the corner and have a clean right angled outer lip 40.

The extrusions 10 have sealing lips 40 as before which bear against the infill, e.g. double glazing unit, in use. In accordance with the invention it is preferred, in addition, to provide a second sealing lip 42 on the extrusions 10 which can be continued in the area of the join 32. This ensures that the corner is weather-tight and obviates the need to radius the inner corner of the join, i.e. the seal 40, allowing a "clean" 90° angle to be achieved. It is preferred to radius the inner lip 42 and have a clean right outer lip 40.

As can be seen from FIG. 8, some extrusions have different coloured areas 24a and 24b and these can be carried right through the joint in the method of the invention.

What is claimed is:

1. A method of forming a joint between two plastic extrusions having front and rear surfaces with solid material between said surfaces comprising; mitring the extrusions so they form the desired angle to one another at a mitre joint across the entire extrusions, removing a solid part of the rear face of each extrusion behind said front surfaces while maintaining the integrity of said front surface of each extrusion across the entire extrusion, placing the mitred extrusions in a mould and injecting a resin material to restore the solid shape and bond the extrusions to one another across the mitred joint beneath the front surfaces and produce the desired joint configuration whereby the front surface of the joint is entirely defined by the front surfaces of the original mitred extrusions.

2. A method of forming a joint between two plastic extrusions of solid material having front and rear surfaces comprising the steps of;

mitring the extrusions of mitred ends across the entire extrusions so that they form the desired angle to one another at the mitred ends, removing solid portions of the rear surface of each extrusion along a line at the mitred ends behind the front surfaces to maintain the front surfaces across the entire extrusions to maintain the integrity of the front surfaces at the mtired ends across the entire extrusions, placing the mitred extrusions in a mold to form a mitred joint with the front surfaces abutting one another at the mitred joint across the entirety of the original extrusions, injecting a plastic material into the mold along the line to rebuild the removed portion entirely behind the front surfaces with a solid plastic material and bond the extrusions together across the mitred joint beneath the original front surfaces.

3. A method as set forth in claim 2 including at least one sealing lip on the rear surface and injecting the plastic material into the mold to form a continuation of the sealing lip between the extrusions.

4. A method as set forth in claim 2 including male foot portions for insertion into a channel to retain the extrusions to a structure and injecting the plastic material into the mold to form at least one extension of the foot portions.

* * * * *